July 21, 1953     L. N. JOHNSON     2,646,099
ANTISKID TIRE CHAIN
Filed May 23, 1950                 2 Sheets-Sheet 1
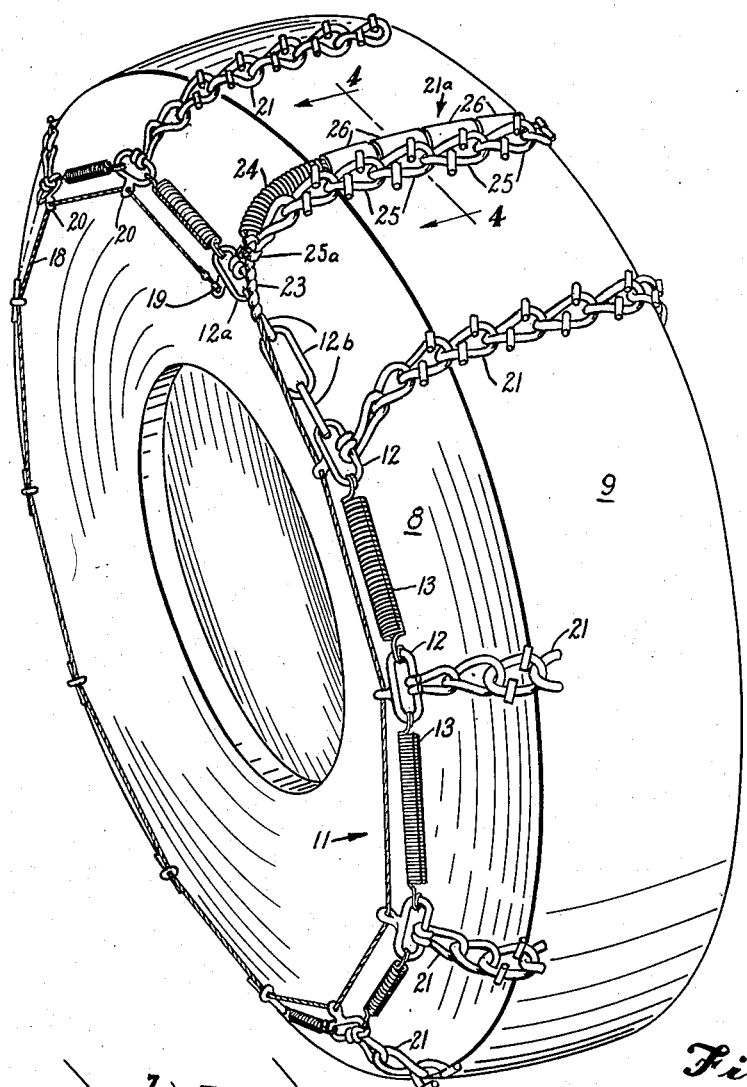
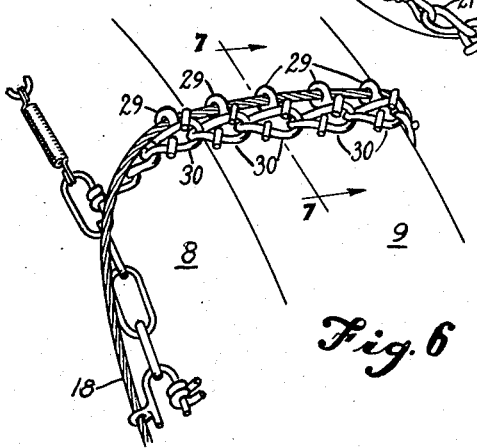
Fig. 1
Fig. 6     Fig. 7
INVENTOR.
LEE N. JOHNSON
BY
Arnold and Mather
Attys.

July 21, 1953　　　L. N. JOHNSON　　　2,646,099
ANTISKID TIRE CHAIN
Filed May 23, 1950　　　　　　　　　　2 Sheets-Sheet 2
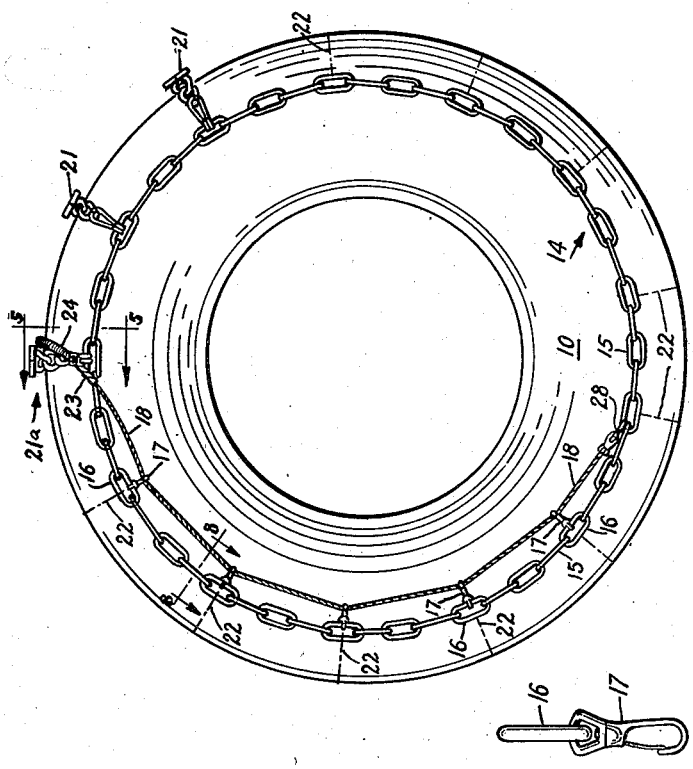
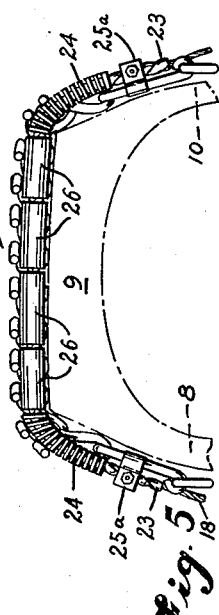
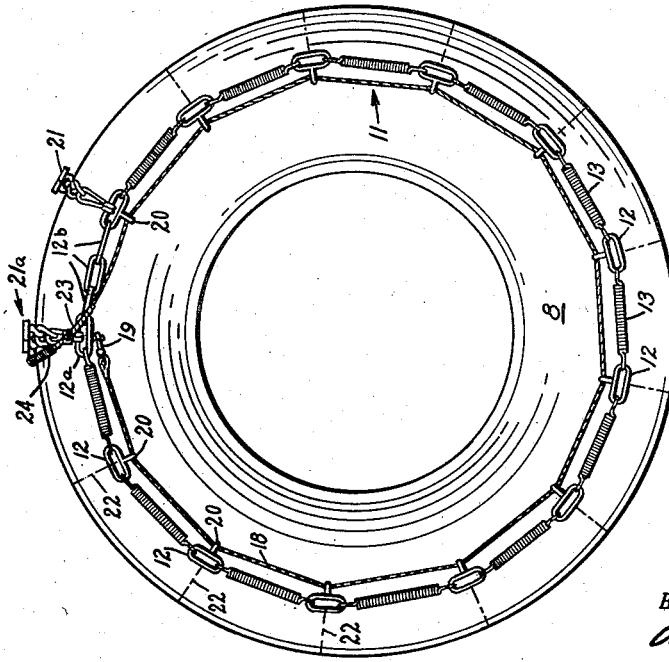
INVENTOR.
LEE N. JOHNSON
BY
Arnold and Mathis
Attys Patented July 21, 1953

2,646,099

UNITED STATES PATENT OFFICE 2,646,099

ANTISKID TIRE CHAIN

Lee N. Johnson, Seattle, Wash.

Application May 23, 1950, Serial No. 163,750

9 Claims. (Cl. 152—213)

My invention relates to a tire chain device for use on tires, as pneumatic tires, which are employed on many articles of mobile equipment, e. g., automobiles, trucks, tractors, military vehicles and the like.

When a piece of mobile equipment does not have the desired traction, due to snow, ice, mud, or the like, rubber-tired mobile equipment fails to obtain sufficient traction with a solid base and it is often necessary to put on chains so that the equipment, as an automobile, can pull its way out of a rut or to provide sufficient traction with the road. Very often chains are put on the tires under most adverse conditions, as most motorists are averse to putting on chains until road conditions demand and positively require the use of chains.

With present chains on the market, it is necessary to get the chain in place and then get under the car or automobile to secure the circumferentially disposed carrier chain which runs about the outer surface of the inside wall (hereinafter referred to as the "inner wall") of the tire and then to secure the circumferentially disposed chain which runs about the outer surface of the outside wall (hereinafter referred to as the "outside wall") of the tire. When this is done under road conditions, as it is often done, a task involving inconvenience, substantial effort and substantial dirt and grime is involved when one is working from the underside of a car and adjacent the inside sidewall of a tire. There is a growing tendency in automobile design to decorate the outside of the automobiles and place the tires and particularly the inside wall thereof so that the same is not readily accessible and requires considerable crawling under a car to gain access thereto.

It is an object of my invention to provide tire chains of a type so that they can be installed in operative position by an operator located adjacent the outside wall of the tire and thus to eliminate all the inconveniences incident to getting under a car and adjacent the inside sidewall of the tire.

It is a further object of my invention to provide a tire chain mechanism which is readily adjusted to properly fit a particular tire and with a minimum effort by the operator to obtain such results.

It is another object of my invention to provide a tire chain having a circular resilient carrier chain for disposition adjacent the inside wall of a tire and to be inserted in place by passing said carrier chain over the tire from a position adjacent the outside wall of the tire and to provide a choker line or cable which starts at a given location on the inside wall of the tire, passes circumferentially about said tire on the inside wall, thence passes crosswise of the tire to the outside wall, and thence circumferentially about the tire on the outside wall until a substantial area of said outside wall is encompassed circumferentially thereof.

It is a further object of my invention to provide guard and guide means positioned transversely or crosswise of the tire and over the tread thereof to protect and position a choker cable as the same passes from the inside wall of a tire, over the tire, and to end alongside of the outside wall of the tire.

Other objects and advantages of the invention will become apparent as the description of the same proceeds and the invention will be best understood from a consideration of the following detailed description taken in connection with the accompanying drawings forming a part of the specification, with the understanding, however, that the invention is not to be limited to the exact details of construction shown and described, since obvious modifications will occur to a person skilled in the art.

In the drawings, Figure 1 is a perspective view with parts broken away showing a device of my invention secured in place on an automobile tire and with parts of the chain construction being broken away where merely duplication of parts was involved, said view looking at the inside wall of a tire;

Fig. 2 is a view in elevation looking at the outside wall of the tire;

Fig. 3 is a view in elevation looking at the inside wall of the tire;

Fig. 4 is a sectional view taken substantially on broken line 4—4 of Fig. 1;

Fig. 5 is an elevational view taken substantially on broken line 5—5 of Fig. 2;

Fig. 6 is a fragmentary perspective view indicating the details of a modified form of my invention;

Fig. 7 is an elevational view taken substantially on broken line 7—7 of Fig. 6; and Fig. 8 is a detached perspective view of one of the snap fasteners employed on the outer sidewall of the tire.

Referring to the drawings, a tire of standard construction is somewhat schematically shown, and 8 indicates the inner sidewall of the tire, 9 the tread wall portion and 10 the outer sidewall portion. The circumferentially disposed connector chain means 11 (see Figs. 1 and 3) for disposition adjacent the inner sidewall 8 comprises links 12 and alternately disposed springs 13. The circumferentially disposed connector chain 14 (see Fig. 2) for disposition adjacent the outer sidewall 10 comprises links 15 and 16, links 16 differing from links 15 in that links 16 support snap fasteners 17. The snap fasteners 17 each pivotally connect at one end portion with a link 16 and at the other end releasably engage with choker cable 18 for releasably receiving and guiding a portion of choker cable 18.

Referring more particularly to Figs. 1 and 3 of the drawings, an end portion 19 of choker cable 18 pivotally connects with a link 12a and passes circumferentially about the inner sidewall 8 and is guided by guide eyes 20 secured to links 12. Transverse or cross links 21 of usual construction each have one end secured to a link 12 and one of such standard cross links is shown in Fig. 3 and two thereof are shown in Fig. 2. Also, two of said cross links 21 are shown in Fig. 1, and fragments of three others are shown in Fig. 1. This practice is pursued in the interest of clarity of the drawings, as any further showing of merely duplicate parts would not tend to clarify. However, in Figs. 2 and 3, the cross links are diagrammatically illustrated by dot-and-dash lines 22.

After choker cable 18 passes circumferentially about the inner sidewall 8 and reaches substantially the location of the end portion 19 thereof which was secured to link 12a, the choker cable 18 passes through a sheath 23 which extends transversely of the tire. Thus, a portion of the sheath 23 is shown on each side of the tire in Fig. 5 and a portion thereof is shown in the sectional view Fig. 4. One of the cross links 21 is numbered 21a and the same is shown in elevation in Fig. 5. This cross link 21a provides for guiding and properly disposing choker 18 as the same passes transversely or crosswise of the tread wall 9 of the tire. The sheath 23 may be in the nature of a metallic covering, such as commonly used as a sheath on electric wires and provides for a flexible tubing through which choker cable 18 may pass. In order to prevent the sheath 23 from bending too sharply as it rises up to or passes down from the tread wall 9, preferably additional sheaths 24 are provided which may be in the nature of helical springs. The end portions of sheath 23 are connected to cross link 21a by clamp means 25a on opposite sides of the tire, as indicated in Fig. 5. Each of the cross links 25 of the cross link member 21a (see Figs. 1 and 4) is welded or otherwise secured to a tubular member 26. Most tire chains employ four cross links 25 for contact with the road at the tread wall area 9 and hence in conformity therewith and as an illustration of my invention, I have shown four tubular members 26, Fig. 1 of the drawings. Also, the cross links 25 shown are merely illustrative of a commonly used type of cross link. The tubular member 26 preferably follow the cross links 25 in direction of travel of the tire to afford maximum wear on the cross links 25 and minimum wear on the tubular members 26. Thus, chains of my invention preferably will be made in pairs for the left and right hand tires of the vehicle. The length of the parts is such so that sheath 23 is preferably under slight compression.

After the choker cable 18 emerges from the sheath 23 at the outer sidewall 10 of the tire (see Fig. 2) the choker cable 18 passes through snap fasteners 17 carried by the links 16 (see Figs. 2 and 8), and preferably the choker cable 18 is long enough so that when it is fully extended and tightened in use the choker cable 18 passes approximately one-half way around the outside wall 10 and then is connected by a snap fastener 28 to one of the links of the connector chain 14 and preferably to one of the links 16.

In the modified form of my invention shown in Figs. 6 and 7 of the drawings, a simplified construction is shown which eliminates sheath 23, springs 24, and tubular members 26. Such parts are replaced by eyes 29 secured to cross links 30, which cross links 30 otherwise duplicate the cross links 25. The choker cable 18 functions similarly in the construction of Figs. 6 and 7 as it does in the previous figures and therefore is given the same number.

As the choker cable 18 may be detached from a link 16 by a detachable snap fastener 28 (to permit initial threading) and as all of the snap fasteners 17 may be released from the portion of the choker cable 18 lying adjacent the outer wall 10, sufficient choker cable 18 may be passed through the transverse guide way, comprising in Figs. 1 to 5 inclusive, sheath 23, springs 24 and tubes 26 so that the peripheral length of the connector chain means 11 (as shown in Fig. 3) may be sufficiently loose so that the same will readily pass over a tire from the outside (by expansion of springs 13) and assume the position shown in Fig. 3 where said cable connector means 11 is suitably positioned adjacent the inner tire wall 8. The snap fastener 28 or the snap fastener 19 is detachable from cable 18 to permit initial threading of cable 18. Also, some or all of the links 15 and 16 forming the outer cable connector means 14, as well as the link 12b forming a part of the inner wall connecting means 11, may be of usual split construction so that links can be removed to obtain the desired fit for an individual tire, all in accordance with common practice. In other words, in accordance with common practice one size tire chain is made to cover three or four sizes of tires and individual adjustments to fit a smaller size tire in a given group are made by removing links. This procedure may be followed with tire chains of my invention.

Assuming that a tire chain of my invention is to be mounted on a tire comprising inner sidewall 8, tread wall 9, and outer sidewall 10, and while the tire is secured to a vehicle, the vehicle may be "jacked upwardly" until the tire is free from the road. Then, the vehicle operator loosens snap fastener 28 and removes choker cable 18 from snap fasteners 17. Then the inner connector chain 11 may be caused to assume substantially a circular path. Due to the fact that the choker cable 18 will be loose on the outside and inside, the only inner connector chain which must be expanded to pass over the tire will comprise links 12 and springs 13. Thus, the inner connector cable can be worked over the tire from the outside, and to its desired position by expanding springs 13. In so doing, the operator will work the outer connector chain 14 into appropriate position and then all the slack will be taken up by tightening choker cable 18. As soon as the choker cable 18 is tightened to the desired extent and portions thereof pass through snap fasteners 17, its snap fastener 28 is secured to one of the links 15 or 16 of the outside connector chain 14. Thus, while inserting the tire chain in place, the inner connector chain 11 is limited only by links 12 and flexible springs 13 (cable 18 is slack) so the same can be readily inserted in place. However, when the tire chain is in use, the choker cable 11 will form the sole effective connector chain at the inside sidewall 8 of the tire, so that the inner connector chain 11 will not expand by centrifugal force while the tire is in use. Also, the choker cable 18 in passing about half-way around in a circumferential direction on the outer sidewall 10 functions to take all of the slack out of the outside connector chain 14. The choker cable 18 passes around the outer wall 10 at least enough so as to provide sufficient slack of cable 18 so that connector cable 11 readily passes over a tire from the outside.

I have found in actual practice that my tire chain lends itself readily to be inserted in place without the necessity of "jacking up" the car, and as a matter of fact, I preferably recommend that the chain be applied in the manner next described, wherein the car is not "jacked up" and the wheel on which the tire chain is to be applied remains on the road. A portion of the inner connector member 11 is passed over the tire and adjacent the inner wall 8. Preferably, the portion of the inner connector member 11 which connects with the cross link 21a should be passed over the tire. At the same time, the location of the tire involved should preferably be the upper portion furtherest removed from the road. Due to the expansible characteristics of the inner connector member 11, portions of the inner connector member 11 can be worked over the tire and to the portion thereof adjacent the inner sidewall 8 indicated in Fig. 3 of the drawings, but, of course, the lower portion of the inner connector member 11 cannot be worked past the tire at the location the tire engages the ground. Due to the tension of springs 13 the inner connector 11 will tend to stay in the position indicated and then the car can be moved a short distance forwardly or backwardly and the part of the tire which previously engaged the road will be removed therefrom so that the balance of connector member 11 may be moved so that the connector member 11 will assume the position shown in Fig. 3 of the drawings. Then the choker cable 18 can be tightened and secured in place as previously described. After initial installation of the chain, sometimes I find it necessary to drive the car forwardly or backwardly a short distance so that the chain tends to adjust itself and then re-tighten the chain by connecting snap fastener 28 with an appropriate link 16.

From the foregoing, it is obvious that I have provided an expansible first connector means 11 which is adapted to be disposed circumferentially adjacent the inner sidewall of a tire. The expansible first connector means 11 carries a plurality of cable guide means, as eyes 20, which are disposed about the expansible connector means 11 and through which a cable, as choker cable 18, may be threaded to follow the path of connector means 11. A second connector means may comprise links 15 and 16 which are adapted to be disposed adjacent the outer sidewall of a tire. A transverse cable guide means adapted to extend crosswise of the tire may comprise the tubular members 26 of Figs. 1 to 5, the springs 24, the flexible conduit means 23, and the clamps 25a connecting the first connector means 11 with the second connector means 14. Preferably, the transverse cable guide means is connected with one of the cross links of the tire chain, such as 21a. Next, a cable, as choker cable 18, is connected with connector means 11 as by snap fastener 19, then extends circumferentially around the inner wall of the tire and is guided by eyes 20. Then the choker cable 18 passes crosswise of the tire, through the transverse cable guide means, and comes out at the outer sidewall of the tire and extends through snap fasteners 17 and is finally secured to one of the links 15 or 16 by suitable means, such as a snap fastener 28.

Obviously, changes may be made in the forms, dimensions, and arrangement of the parts of my invention without departing from the principle thereof, the above setting forth only preferred forms of the embodiment of my invention.

I claim:

1. A tire chain comprising an expansible first connector means adapted to be disposed circumferentially adjacent the inner sidewall of a tire; a plurality of cable guide means disposed about said expansible connector means and through which a cable may be threaded to follow the path of said expansible connector means; a second connector means adapted to be disposed adjacent the outer sidewall of a tire; transverse cable guide means adapted to extend crosswise of the tire tread portion of a tire and connect between said first and second connector means; and cable means connected with a portion of said expansible connector means, threaded through said cable guide means and extending circumferentially for substantially 360° about the said inner tire sidewall, threaded through said transverse cable guide means to extend substantially transversely of the tread portion of a tire to the said outer sidewall of a tire, and adapted to be connected to the second connector means.

2. A tire chain comprising an expansible first connector means comprising links and springs adapted to be disposed circumferentially adjacent the inner sidewall of a tire; a plurality of cable guide means disposed about and connected with said expansible connector means and through which a cable may be threaded to follow the path of said expansible connector means; a second connector means adapted to be disposed adjacent the outer sidewall of a tire; transverse cable guide means adapted to extend crosswise of the tire tread portion of a tire and connect between said first and second connector means; and cable means connected with a portion of said expansible connector means, threaded through said cable guide means and extending circumferentially about the said inner tire sidewall, threaded through said transverse cable guide means to extend substantially transversely of the tread portion of a tire to the said outer sidewall of a tire, and adapted to be connected to the second connector means.

3. The combination of claim 2 wherein the transverse cable guide means comprises a plurality of hollow tubular members each of which is connected to a separate link of the tire chain cross link means.

4. The combination of claim 2 wherein the transverse cable guide means comprises a plurality of eye members each of which is connected to a separate link of the tire chain cross link means.

5. The combination of claim 2 wherein the transverse cable guide means comprises a plurality of tubular members, flexible conduit means threaded through said tubular members.

6. The combination of claim 2 wherein the transverse cable guide means comprises a plurality of tubular members extending substantially across the tread portion of a tire, spring means extending downwardly on each sidewall of the tire, flexible conduit means threaded through said tubular members and said spring means, and clamp means connecting the flexible conduit means with said first and second connector means respectively.

7. A tire chain comprising an expansible first connector means adapted to be disposed circumferentially adjacent the inner sidewall of a tire; a plurality of cable guide means disposed about said expansible connector means and through which a cable may be threaded to follow the path of said expansible connector means; a second connector means adapted to be disposed adjacent the outer sidewall of a tire; a plurality of cable guide means connected with said second connector means; transverse cable guide means adapted to extend crosswise of the tire tread portion of a tire and connect between said first and second connector means; and cable means connected with a portion of said expansible connector means, threaded through said cable guide means and extending circumferentially for substantially 360° about the said inner tire sidewall, threaded through said transverse cable guide means to extend substantially transversely of the tread portion of a tire to the said outer sidewall of a tire, threaded through said cable guide means connected with said second connector means and adapted to extend circumferentially about said outer sidewall of a tire, and adapted to be connected to the second connector means.

8. The combination of claim 7 wherein the cable guide means connected with the second connector means are of the snap fastener type permitting insertion of a cable in place intermediate the length of a cable.

9. A tire chain comprising an expansible first connector means adapted to be disposed circumferentially adjacent the inner sidewall of a tire; a plurality of cable guide means disposed about said expansible connector means and through which a cable may be threaded to follow the path of said expansible connector means; a second connector means adapted to be disposed adjacent the outer sidewall of a tire; transverse cable guide means connected with a flexible tire chain cross link means connecting between said first and second connector means; and a cable means connected with a portion of said expansible connector means, threaded through said cable guide means and extending circumferentially for substantially 360° about said inner tire sidewall, threaded through said transverse cable guide means to extend substantially transversely of the tread portion of a tire to the said outer side wall of a tire, and adapted to be connected to the second connector means.

LEE N. JOHNSON.

References Cited in the file of this patent

UNITED STATES PATENTS

| Number | Name | Date |
|---|---|---|
| 953,673 | Weed | Mar. 29, 1910 |
| 1,358,391 | Pendleton | Nov. 9, 1920 |
| 1,560,525 | Barrell | Nov. 10, 1925 |
| 1,627,555 | Gause | May 10, 1927 |
| 2,275,994 | Ruhkala | Mar. 10, 1942 |
| 2,324,463 | Brady | July 20, 1943 |